United States Patent
Dahill

[11] Patent Number: 5,951,077
[45] Date of Patent: Sep. 14, 1999

[54] MULTI-TIERED SHOVEL

[76] Inventor: Henry Dahill, 2378 NW. McDougal Ct., Prineville, Oreg. 97754-0302

[21] Appl. No.: 09/123,654

[22] Filed: Jul. 28, 1998

[51] Int. Cl.[6] ........................................................ A01B 1/02
[52] U.S. Cl. ................................................ 294/49; 294/51
[58] Field of Search ................................. 294/49, 51, 60; 7/114, 116; 30/315, 353, 355, 357; 172/13, 19, 371, 378, 380, 381; 254/131.5, 132; D8/9, 10

[56] References Cited

U.S. PATENT DOCUMENTS

| | | | |
|---|---|---|---|
| 519,251 | 5/1894 | Feneran et al. | 30/315 |
| 680,275 | 8/1901 | Phillips | 294/49 |
| 808,168 | 12/1905 | Reed | 294/49 |
| 836,541 | 11/1906 | Spriggs | 294/60 X |
| 1,263,949 | 4/1918 | Singer | 294/49 |
| 3,226,149 | 12/1965 | McJohnson | 294/60 X |
| 3,645,578 | 2/1972 | Renfroe . | |
| 3,848,915 | 11/1974 | Wherry . | |
| 3,851,763 | 12/1974 | Ball et al. . | |
| 4,135,751 | 1/1979 | Gederos . | |
| 4,247,141 | 1/1981 | Grint . | |
| 4,411,320 | 10/1983 | Hass | 172/380 X |
| 4,461,458 | 7/1984 | Poulin . | |
| 4,476,939 | 10/1984 | Wallace . | |
| 4,682,917 | 7/1987 | Williams, III et al. . | |
| 4,916,984 | 4/1990 | Albert . | |
| 5,310,231 | 5/1994 | Burkhart . | |
| 5,533,578 | 7/1996 | Powell . | |
| 5,657,922 | 8/1997 | Lowery et al. . | |

FOREIGN PATENT DOCUMENTS

| | | | |
|---|---|---|---|
| 24087 | 8/1950 | Finland | 294/49 |
| 121248 | 2/1971 | Norway | 294/49 |
| 22686 | 6/1906 | Sweden | 294/51 |
| 2198021 | 6/1988 | United Kingdom | 294/49 |

*Primary Examiner*—Johnny D. Cherry
*Attorney, Agent, or Firm*—Chase & Yakimo, L.C.

[57] ABSTRACT

A multi-tiered shovel includes a generally stepped blade carried by a shaft with a handle. The blade comprises a lower distal portion, relative to user, having a pointed configuration with tapered edges extending upwardly and outwardly therefrom to a juncture between the lower portion and an adjacent medial portion. The medial portion is then defined by the blade edges which extend outwardly and upwardly to a juncture between the medial portion and an adjacent upper proximal portion. The blade edges likewise define the upper portion by extending outwardly and upwardly between the juncture between medial and upper portions and an upper edge of the overall blade. Accordingly, portions of the blade can be urged into the ground when force is applied to the top edge of the blade by a user's foot. Successive forces may thereafter be applied to cause the blade to penetrate the ground to a desired depth. The outwardly tapered edges adjacent each juncture provide the resistance to user pressure to facilitate accurate depth and width penetration.

5 Claims, 4 Drawing Sheets

MULTI-TIERED SHOVEL

BACKGROUND OF THE INVENTION

This invention relates to shovels and, more particularly, to a shovel having a tiered blade which can easily and accurately penetrate soil in a uniform manner.

A variety of devices are presented in the prior art for penetrating and moving soil. Although assumably effective in operation, these devices do not eliminate two common difficulties. Specifically, it is often difficult to penetrate hardened or rocky soil using traditional shovel devices. A conventional rounded shovel blade often meets great resistance when pushed against hardened soil. A related difficulty is regulating the depth and/or width to which a traditional shovel blade is inserted into hardened soil. Penetration to a particular depth and/or width is desirable so as to create a particularly sized hole for planting plants or the like. While a thin blade characteristic of a spade may be useful to penetrate hardened soil, such a blade does not accommodate depth and/or width regulation and does not allow for moving any substantial quantity of soil.

It is therefore desirable to have a shovel that is configured such that initial penetration of hardened or rocky soil is simplified. It is further desirable to have a shovel with a blade that can be more accurately and/or uniformly inserted to various user-selectable depths within the ground.

SUMMARY OF THE INVENTION

In response thereto, I have invented a shovel having a generally stepped shovel blade carried on a shaft with a handle. The blade includes a plurality of tiered portions which ease penetration of the blade into the ground and which allow the blade to penetrate the ground to user selectable depths. A lower distal portion of the tiered blade includes a pointed end with edges of the blade being outwardly and upwardly tapered to an adjacent second portion, the edges defining a lateral extent of the blade. The second medial portion is similarly defined by outwardly and upwardly extending edges which define a greater lateral extent of the blade relative to the adjacent distal portion. Subsequent tiers are similarly defined by tapered edges so as to define successively greater lateral extents of the blade. Accordingly, successively greater portions of the shovel blade can be urged into the ground by the pressure of a user's foot thereon with the upwardly extending edges serving as guides to measure the depth of penetration of each blade portion. Also, the outwardly extending edges present guides to measure the width of the initial penetration of each blade portion into the ground.

It is therefore a general object of this invention to provide a tiered shovel which can more easily penetrate hardened or rocky soil.

Another object of this invention is to provide a tiered shovel, as aforesaid, which can penetrate the ground to a user selectable depth and/or width.

It is a further object of this invention to provide a tiered shovel, the quantity of soil moveable by the shovel being dependent upon the depth of blade penetration.

Another particular object of this invention is to provide a shovel, as aforesaid, which allows the user to dig holes of various cross-sectional areas to a uniform depth.

It is a still further object of this invention to provide a tiered shovel which is durable and non-corrosive.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
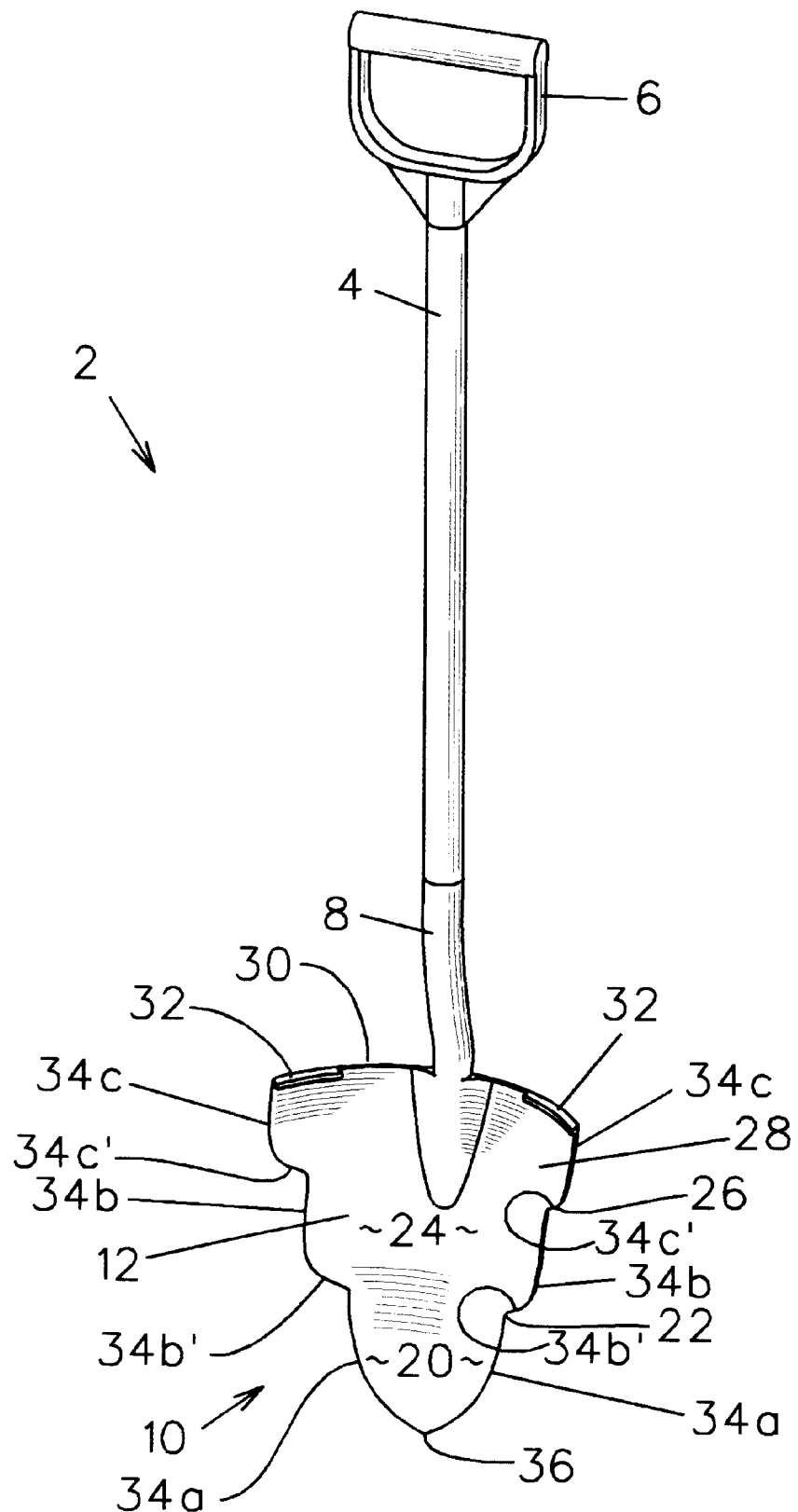
FIG. 1 is a perspective view of the shovel.
Figure 2:
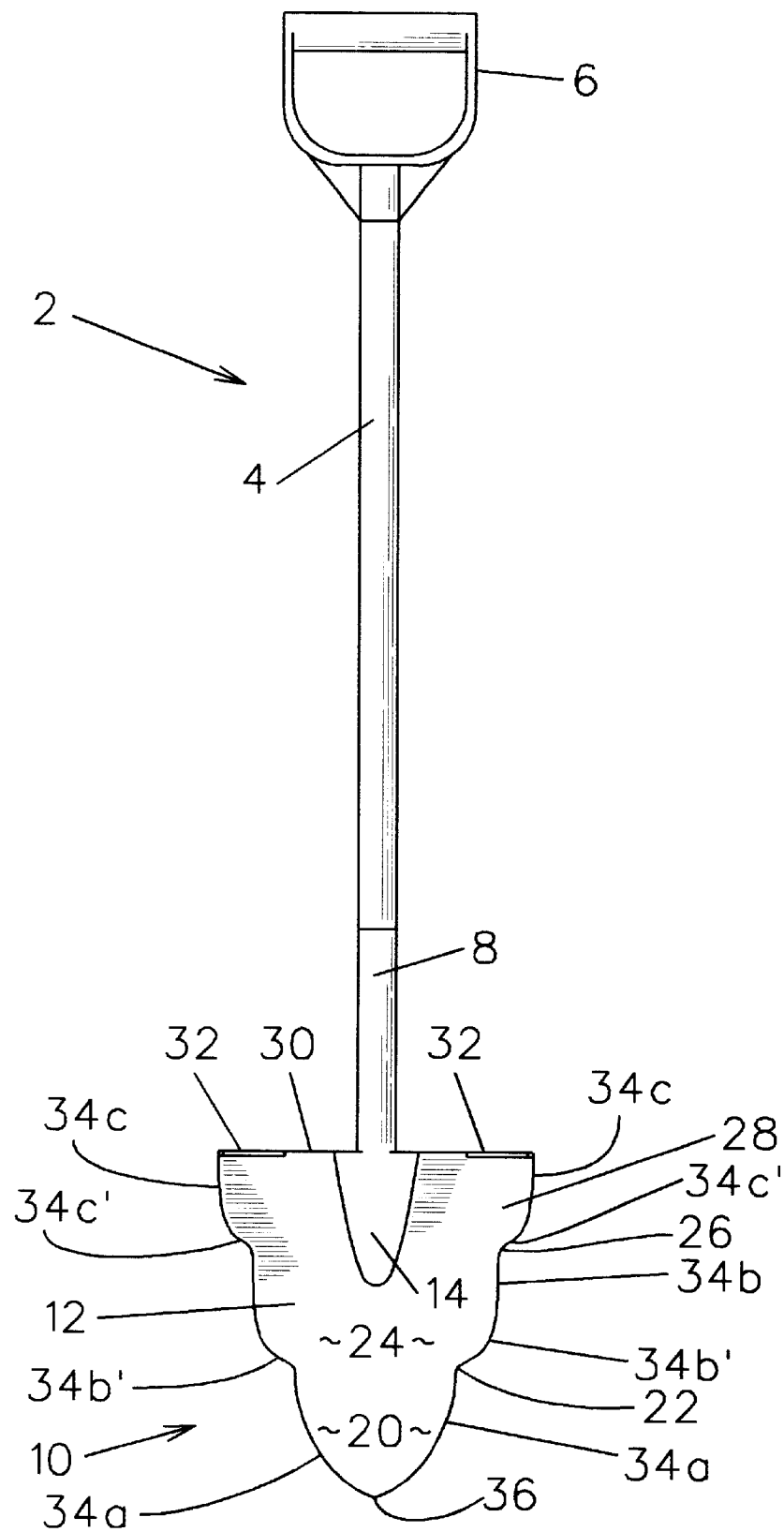
FIG. 2 is a front view of the shovel of FIG. 1.
Figure 3:
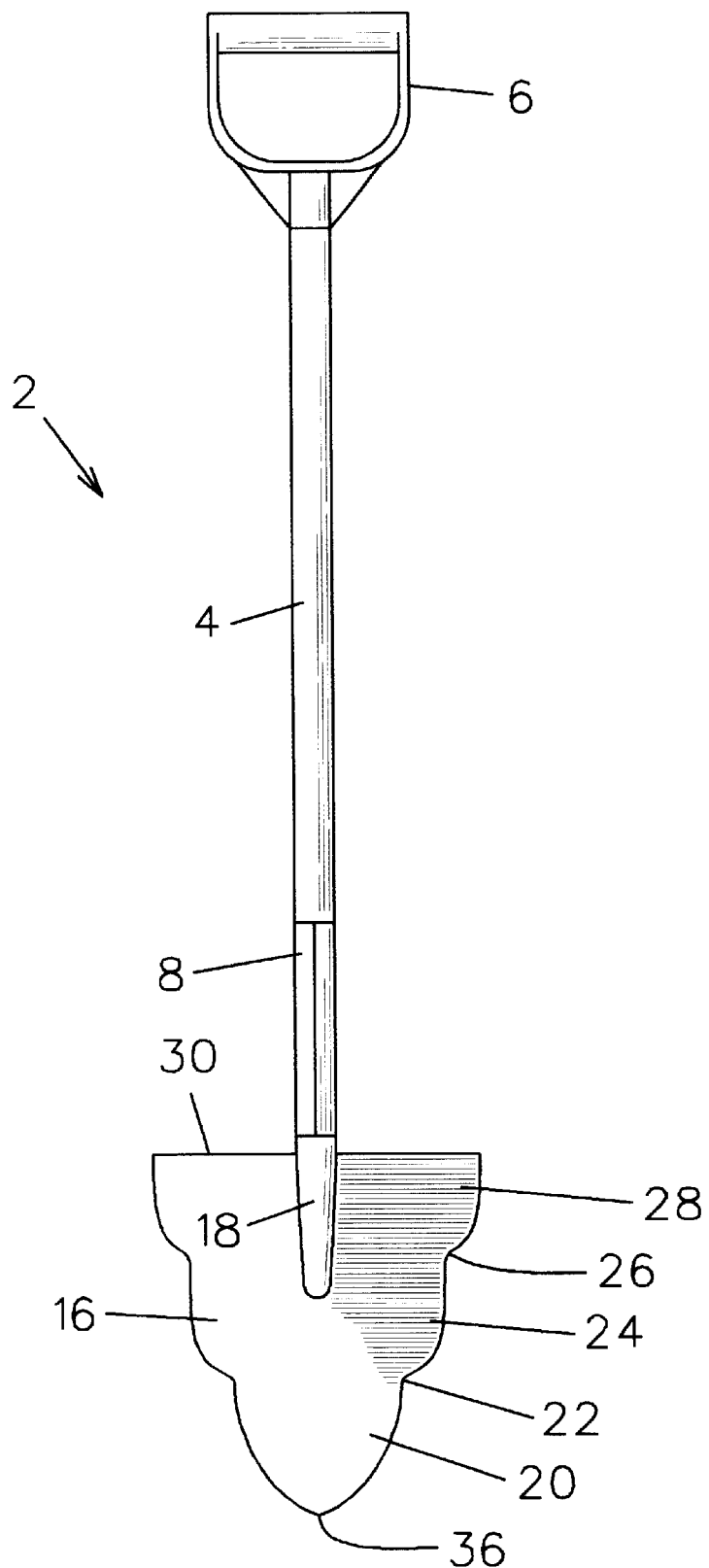
FIG. 3 is a rear view of the shovel of FIG. 1.
Figure 4:
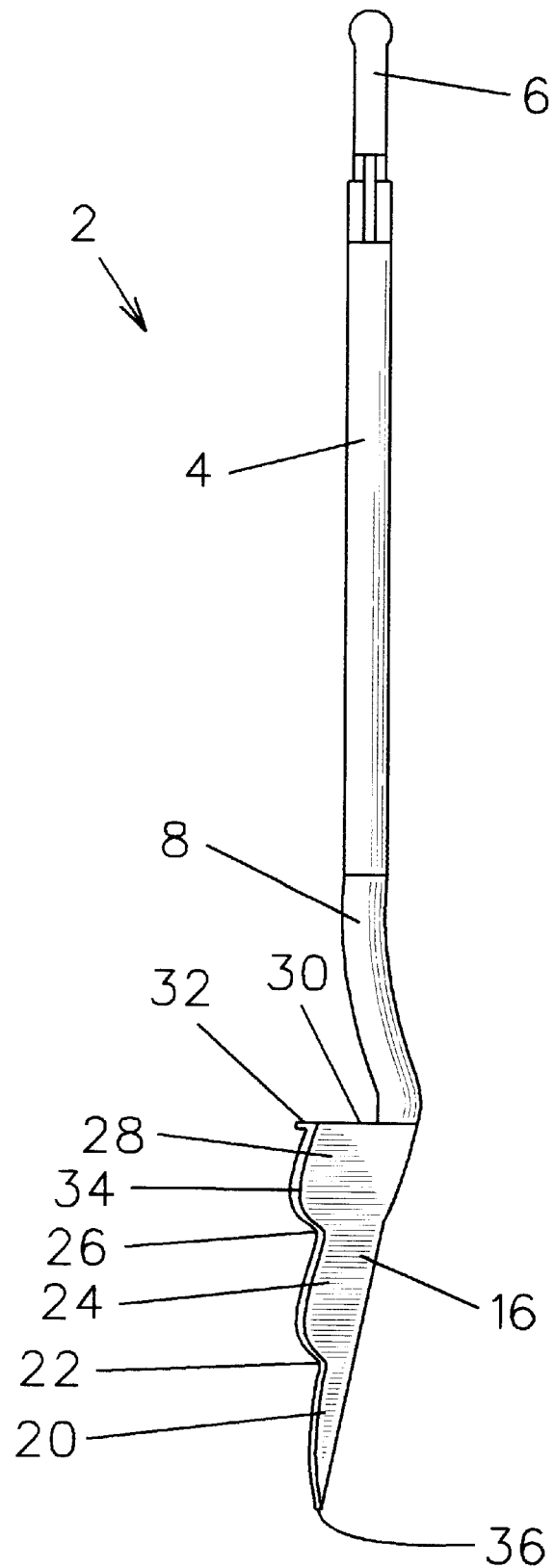
FIG. 4 is a right side view of the shovel of FIG. 1, the left side view being a mirror image thereof.

Turning more particularly to the drawings, FIGS. 1 through 4 show the now preferred embodiment of the multi-tiered shovel 2. The shovel 2 includes a shovel blade 10 which is carried on a distal end of a shaft 4. The blade 10 is preferably constructed of a durable, non-corrosive material such as stainless steel. The blade 10 is of a generally triangular outline and is symmetrical about the longitudinal axis of the shaft 4. The blade 10 is slightly curved frontwardly about the axis of the shaft 4 such that the front face 12 of the blade presents a centrally depressed area. This curvature is useful for holding soil on the front face during a digging operation.

The blade 10 further comprises integrally connected lower/distal 20, medial 24, and upper/proximal 28 blade portions, relative to the user, the lateral extent of each blade portion being defined by upwardly extending outer edges 34a, 34b, 34c of the blade 10. The lower blade portion 20 presents a free pointed end 36 with the blade edges 34a upwardly diverging therefrom to the juncture 22 between lower 20 and medial 24 portions, the edges 34a being gradually tapered outwardly and upwardly therebetween. The lateral extent of the medial portion 24 is greater than the distal portion 20. Accordingly, the medial portion 24 presents blade edges 34b' which laterally extend from the juncture 22 or end points of edges 34a. At the end points of edges 34b', the edges 34b upwardly extend to their end points which define the juncture 26 between medial 24 and upper/proximal 28 portions. In like manner, the lateral extent of the adjacent proximal portion 28 is greater than the medial portion 24. Accordingly, the proximal portion 28 edges 34c' laterally extend from juncture 26. Edges 34c which bound the lateral extent of proximal portion 28 then extend to the top edge 30 of the overall blade 10, thereby defining the upper portion 28.

Thus, it can be seen that the blade portions 24, 28 present left and right laterally extending edges 34b', 34c' for initial penetration of that particular blade portion. These edges define the width of initial ground penetration for that blade portion. Subsequently, upwardly extending edges 34b, 34c define the depth of penetration for that particular blade portion.

Oppositely disposed flanges/plates 32 are normal to the top edge 30 of the blade 10 and extend frontwardly therefrom. Accordingly, a user can place a foot upon a plate 32 and exert downward pressure thereon for piercing the ground with successive, selectable portions of the blade 10. It is understood that initial user pressure can cause the blade to pierce the ground to a first depth corresponding to the lower blade portion 20 as defined by edge 34a. Additional user pressure will then cause the blade 10 to further pierce the ground to a second depth corresponding to the medial blade portion 24 as defined by edge 34b, and so on. The outwardly tapered edges just above each juncture 22, 26 provide resistance to user pressure, thus allowing accurate depth penetration.

It is further noted that concurrent with the blade depression that the various widths/lateral extents of the blade portions present edges 34b′, 34c′ which define the width of the initial shovel penetration into the earth for that blade portion. Thus, the lateral extending edges 34b′, 34c′ serve as guides for the width of initial penetration so as to aid in providing holes of different cross-sectional areas at a uniform depth.

An elongated socket 8 is integrally attached centrally to a raised portion 14 of the upper portion 28 of the front face 12, the upper portion 28 presenting a consequential recess 18 on the back face 16. One end of the shaft 4 is insertably received and fixedly attached within the socket 8. A conventional D-shaped handle 6 is fixedly attached to the opposed end of the shaft 4.

Accordingly, it can be seen that the multi-tiered shovel can more easily penetrate hardened or rocky soil and can penetrate hardened soil to user selectable depths.

It should be understood that while a three-tiered shovel blade has been illustrated and described, a blade having various tiered portions could be utilized herein.

It is understood that while a certain now preferred form of this invention has been illustrated and described, it is not limited thereto except insofar as such limitations are included in the following claims and allowable functional equivalents thereof.

Having thus described the invention, what is claimed as new and desired to be secured by Letters Patent is as follows:

1. For attachment to a distal end of a handle relative to a user, a shovel blade comprising:
   a first distal portion relative to the handle comprising:
      a lower free end presenting a free distal end for initial ground penetration;
      first and second curvilinear edges upwardly diverging from said free distal end in a manner to present generally convex edges relative to an imaginary centerline axis for subsequent ground penetration, said edges bounding a lateral extent of said first distal blade portion therebetween; first and second end points on said edges;
   a medial portion adjacent said distal portion and integral therewith, said medial portion comprising:
      first and second curvilinear edges upwardly diverging from said end points of said first and second edges of said distal portion, said curvilinear edges of said medial portion presenting convex edges relative to the centerline axis for initial ground penetration of said medial portion and first and second end points vertically and laterally displaced from said end points of said first and second edges of said distal portion, said first and second curvilinear edges of said medial portion for initial ground penetration of said medial portion subject to ground penetration of said distal portion;
      first and second upwardly extending edges from said end points of said first and second curvilinear edges of said medial portion, said first and second upwardly extending edges of said medial portion bounding a portion of said shovel blade greater than said lateral extent of said distal blade portion, said upwardly extending edges of said medial portion for ground penetration subsequent to said penetration of said first and second convex edges of said medial portion;
      first and second end points on said upwardly extending edges of said medial portion; and
   a proximal portion adjacent said medial portion and integral therewith comprising:
      first and second curvilinear edges upwardly diverging from said end points of said first and second upwardly extending edges of said medial portion, said first and second curvilinear edges of said proximal portion presenting convex edges relative to the centerline for initial penetration of said proximal portion and first and second end points vertically and laterally displaced from said end points of said first and second upwardly extending edges of said medial portion;
      first and second upwardly extending edges from said end points of said first and second curvilinear edges of said proximal portion, said upwardly extending edges of said proximal portion bounding a portion of said blade greater than said lateral extent of said medial blade portion, said upwardly extending edges of said proximal portion for ground penetration subsequent to said penetration of said first and second convex edges of said proximal portion;
      an upper free edge extending between said upwardly extending edges of said proximal portion and defining the upper end of said proximal portion, whereby said shovel blade comprises a plurality of blade portions successively increasing in width between said distal and proximal ends.

2. The shovel blade as claimed in claim 1 further comprising at least one flange normally extending from said upper free edge for supporting a foot of a user exerting pressure thereon.

3. The shovel blade as claimed in claim 1 wherein said upwardly extending edges of each said portion present a length corresponding to a desired depth of penetration of the blade into the ground for said blade portion bounded therebetween.

4. The shovel blade as claimed in claim 1 wherein said curvilinear edges of each said portion present a visual gauge corresponding to a desired width of penetration of the blade into the ground for said portion.

5. The shovel blade as claimed in claim 1 wherein each of said blade portions is generally arcuate in configuration about the centerline axis.

\* \* \* \* \*